United States Patent Office 3,141,740
Patented July 21, 1964

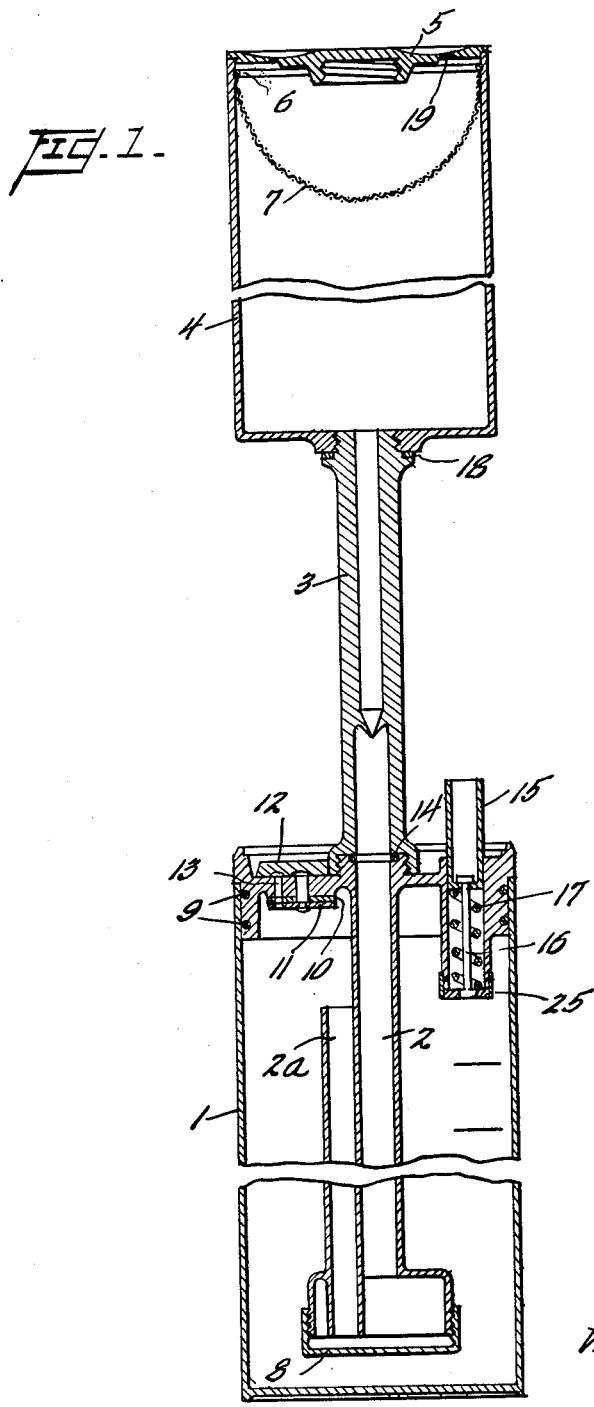

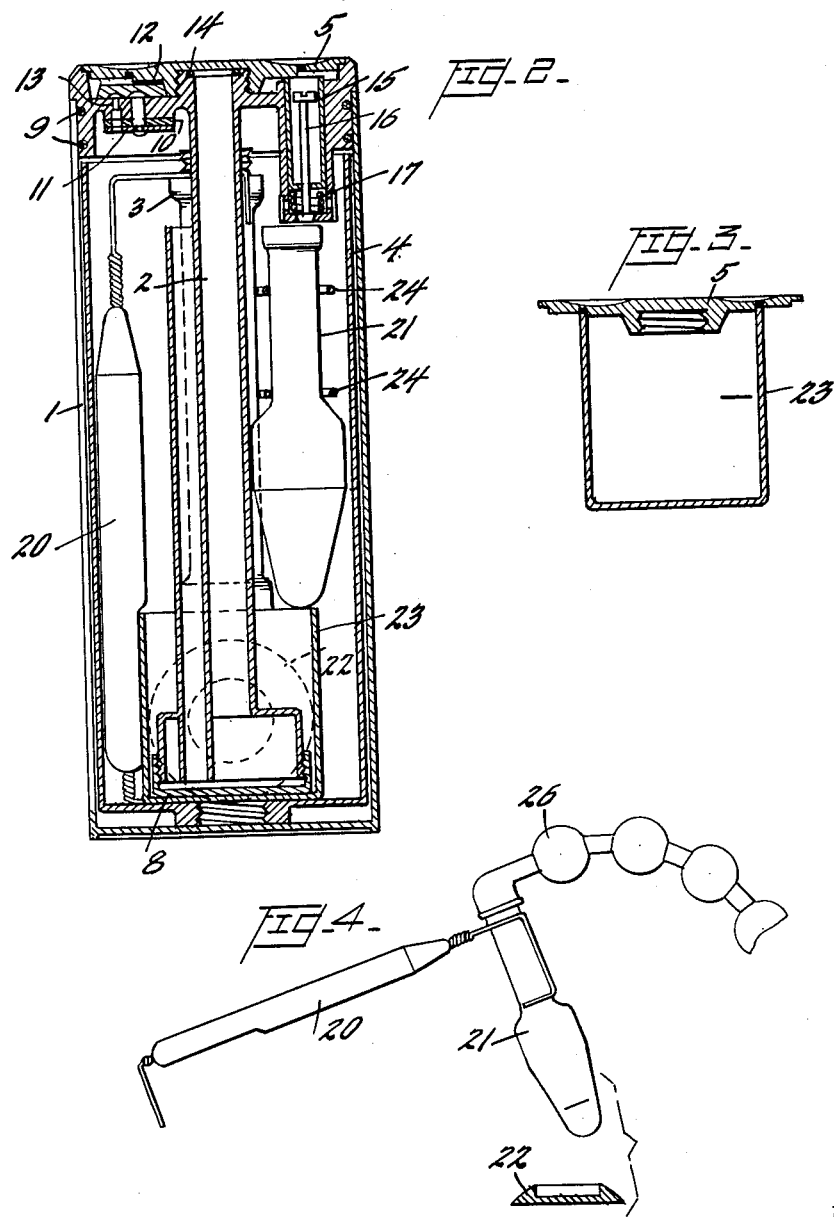

3,141,740
METHOD FOR DETERMINING THE CONCEPTION-FREE PERIOD IN A WOMAN
Werner Wild, Segantinistrasse 70, Zurich, Switzerland
Filed July 13, 1959, Ser. No. 826,617
Claims priority, application Switzerland Oct. 27, 1954
4 Claims. (Cl. 23—230)

This invention relates in general to a method, apparatus and means for determining those periods during which a woman is normally unable to conceive. More particularly, it relates to such a method in which a substance which is present in a woman's body as a result of organic changes accompanying ovulation is qualitatively identified, and an apparatus and means for carrying out the method.

Several important changes which occur in a woman's body directly control the cycles of ovulation and menstruation, and consist principally of shifts in hormone and vitamin levels. These shifts may be determined by examination of the blood or one of the excretory products of the body, and the cycle of ovulation and menstruation thus ascertained.

Many of the phenomena which occur in the female body might be used as the basis of a test for ovulation. In theory, such phenomena as vaginal smears, vaginal pH, cervical mucus crystallization, ferment activity of beta-glucuronidase, vitamin A concentration in blood serum, vitamin C elmination in the urine following vitamin C administration, citric acid or citrate excretion, intermenstrual bleeding, gonadotrophin secretion, oestrogen excretion, and progesterone activity might be utilized. All the above are in some way affected by ovulation.

Vitamin A and C as well as gonadotrophin excretion, however, only show brief maximum values which may occur at inconvenient times and in comparison to progesterone possess a relatively small difference between minimum and maximum values. Oestrogens are excreted in increased quantity, but this commences several days before ovulation and there is also only slight difference between minimum and maximum values. With the exception of progesterone therefore all the other possibilities are very unsuitable or not at all suitable for estimating the conception-free time.

From a practical point of view, progesterone is the only hormone in the body continuously present in amounts readily estimated only after ovulation and up to the following menstrual period. Smaller quantities arising from adrenal cortex metabolism by transformation of part of the desoxycorticosterone into progesterone can always be found in both the female and male body. It is known that progesterone is already produced in the unruptured follicle before ovulation. Thus minute quantities of progesterone are continuously present in the body and, in addition, progesterone secretion sets in before the corpus luteum itself is formed. The presence of progesterone in the body may only be taken as clear evidence for the existence of a conception-free phase following ovulation, if the method of estimation adopted possesses a sensitivity threshold value or inhibiting step which automatically renders the physiological minimal concentrations referred to incapable of estimation. Only in this way will the presence of progesterone show the existence of the conception-free phase following ovulation, and when it first appears provide the point of reference for calculating or obtaining empirically the beginning of that period during which a woman is fertile.

Since it is known that all physiological functions have minimum substance concentrations at which they no longer are guaranteed, the above mentioned sensitivity threshold value or inhibiting effect is necessary not only for determining progesterone but to all methods which could be used to determine biological sterility in a woman on the basis of ovarian metabolism products.

The postovulatory biological sterility is only certain when the corpus luteum functions efficiently, i.e. as soon as the secretion of progesterone is considerably greater than the above minimum values from the adrenal cortex and "pre-luteinization." The presence of a lower sensitivity threshold value of estimation consequently provides a guarantee of an efficiently functioning corpus luteum which of necessity excludes further ovulation, induces a transformation into the secretory phase of the uterine mucosa and increases the viscosity of the cervical mucus. Should a further ovulation take place in spite of normal functioning, the spermatozoa involved would be held up in the viscid cervical mucus and the swollen secreting uterine mucosa so that fertilization would not take place.

It is a main object of the present invention to provide in general for a method which not only determines ovulation as is already known, but also determines that period in a woman which is by guarantee conception-free, that is which excludes fertilization even when a second or further ovulation takes place, in that the method has an inhibiting effect.

A second object of the present invention is to provide in particular for a method of determining when the biologically conception-free period in a woman exists which not only permits results of academic or clinical interest, but which can be used for an efficient birth control, that is which is reliable and not time-consuming.

The most important member of the excretion products of progesterone is pregnanediol, $C_{21}H_{36}O_2$, which appears in the urine on an average of 24 hours after ovulation. It never appears in the free form in the urine, but only in combination with glucuronic acid, which is known to be employed in the body when substances insoluble in water must be excreted in the urine. The non-ketonic excretion product present as monosodium salt of pregnanediol-glucuronic acid with the formula

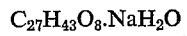
$$C_{27}H_{43}O_8 \cdot NaH_2O$$

is always contaminated with 20 to 25% of the oxyketone pregnanolone, which also arises from progesterone metabolism. The whole complex is readily soluble in butyl alcohol, only of poor solubility in amyl alcohol and more difficultly soluble in water or neutral urine, and insoluble in ether. Although it is actually a glucuronic acid steroid mixture, only pregnanediol glucuronide will hereinafter be mentioned, which is present in the complex in an overwhelmingly large amount.

A whole series of quantitative and qualitative methods for the estimation of pregnanediol for clinical-diagnostic purposes are known. They can be divided into several main groups which differ in principle from one another. One group includes methods in which Na-pregnanediol glucuronide is extracted from fresh urine, purified by means of solvent distribution or precipitated and estimated gravimetrically. In a second group the same technique of recovery and purification is employed, but the glucuronic acid or steroid molecule is estimated colorimetrically. In a third group the urine is subjected to acid hydrolysis, the free pregnanediol is extracted from the hydrolyzed urine, purified by means of solvent distribution and, if necessary, adsorption, and estimated gravimetrically. In a fourth group the same technique of recovery and purification is employed, but only the steroid molecule is estimated colorimetrically by yellow or brown coloration with concentrated sulfuric acid. In a fifth group urine hydrolysis is carried out not by means of acid but by selective splitting of the pregnanediol glucuronide into free pregnanediol and glucuronic acid under the influence of the ferment glucuronidase. In a sixth group the Na-pregnanediol glucuronide is precipitated out of an aqueous solution with the help of a heavy metal, say, barium (after U. Westphal) as Ba-pregnanediol glucuronide.

An analytical method for determining conception-free periods in women should simultaneously satisfy the following four minimum conditions: absolute specificity, threshold value for physiological minimal values, a result at least on the same day that the urine is collected, and sufficient sensitivity for urine from a normal menstrual cycle.

Without specificity a certain reaction in an analytical method would not necessarily be identified with a corresponding process in the body. Without a threshold value the method fails in its purpose, because it is either influenced by the pregnanediol from adrenal cortex metabolism or the pre-ovulatory progesterone secretion and offers no guarantee of a functionally efficient corpus luteum or cannot "foretell" a second subsequent ovulation in the same menstrual cycle. On the other hand, if the result is not immediately available and if several days must pass before the estimation, then it is impossible to check daily for the presence of the unreceptivity, so that there can be no question of the presence of sterility when the result is received, and furthermore the conception-free period is to a great extent past before advantage can be taken of it. It is self-evident that a method should be sufficiently sensitive in order to be employed at all, but this is not at all the case with the great majority of methods for estimating pregnanediol.

None of the known methods simultaneously fulfills the above four conditions and therefore none of them can be employed to determine the conception-free period. The methods of the first and second groups which recover pregnanediol in the form of sodium-pregnanediol glucuronide, are either unspecific or not applicable to urine from the normal menstrual cycle, because these methods are inherently insensitive. Moreover, all variants of the six groups mentioned, which merely determine pregnanediol—in whatever form—gravimetrically, are useless, since gravimetric analysis in no way characterizes a product.

Of the methods of the third and fourth groups some are unserviceable because of insufficient sensitivity, while others which recover free pregnanediol only out of solvent distribution are unspecific, since the only colorimetric possibility of estimation with concentrated sulfuric acid reacts to all steroids, and usually such steroids are present. Of the remaining methods of both these groups, which employ additional purification, possibly by adsorption or repeated recrystallization, all take at least several days to over a week before a result is known, and the conception-free period has, to an extent, passed. Methods of the fifth and sixth groups only provide a result when the conception-free time is largely over and therefore can no longer be taken advantage of. Consequently, these methods possess purely academic and clinical significance. In addition, all methods lack the threshold value already described in detail, since in all of them the aim was to obtain a maximal sensitivity of estimation. As may be seen from the foregoing, the introduction of the threshold value is based on recognition of the fact that between determination of ovulation and determination of postovulatory sterility there exists a principal difference, expressed practically in an adequate or inadequate corpus luteum activity. Sterility is only present when, after ovulation, maturation of the ovum is interrupted, when the uterine mucosa is transformed into its fully secretory phase and the cervical mucus viscosity is increased. This is only the case when the corpus luteum functions normally.

In accordance with the present invention, the method for the determination of the conception-free days may be, by way of example as pregnanediol glucuronide, carried out as follows:

Morning urine is preferably employed or during a day the 7 to 10 hours' excretion of urine, the quantity of which seldom exceeds 700 cc. Water is, if necessary, added to the urine to make 700 cc. of solution. It then is saturated with common salt and amounts to about 770 cc. Extraction is carried out by allowing a thin stream (max. 0.65 mm. diameter) of the urine saturated with salt to fall freely through an opening or nozzle into a layer of solvent of preferably 10 to 11 mm. diameter, consisting of 9 cc. of a technically pure mixture of n-amyl alcohol and n-butyl alcohol in the ratio by volume of 1:2. To avoid the formation of an emulsion, the distance between the nozzle and the level of solvent should be kept constant, as by applying an overflow so arranged that the thin stream impinges on the solvent at the point where it begins to separate into small droplets. In this way the stream is broken up into many fine droplets which, depending on their weight, sink more or less slowly through the amyl-butyl alcohol layer. In this way the pregnanediol glucuronide is extracted. If, in place of the n-alcohols, their iso-forms are used, the dissolving capacity will be smaller. The best measure of the size of the stream is when roughly 22 cc. flow through the nozzle in a minute. For reception of the solvent layer a tube of 10 to 11 mm. diameter and about 20 cm. long is sufficient.

By extracting in this way, the formation of an emulsion is practically avoided. If, however, one does form, it can be broken without difficulty by pushing a cotton plug through the extract.

Upon extraction, the extract, which has a volume of 5 to 6 cc., contains, besides pregnanediol, an appreciable quantity of impurities as a result of saturation with common salt. It should, therefore, be thoroughly washed by allowing the wash fluid to stream like the urine through the nozzle. The wash fluid consists of 40 cc. of an intimate mixture of water, 5 cc. of a technically pure diethylether-butanol mixture in the ratio by volume of 5:1, and about 50 mg. of ammonia and 200 mg. of common salt (the latter is not absolutely necessary).

After this thorough washing, the extract is washed a second time in the same way with 35 to 40 cc. of ordinary, saturated salt water to remove the ammonia and to dehydrate the extract. In most cases the extract is now not merely completely clear, but also colorless despite its being originally 3 to 4 times darker in color than the extracted urine.

The extract thus washed is, despite its lack of color, still relatively impure. For this reason the pregnanediol glucuronide can be precipitated with advantage directly from the extract as a barium salt; however, this is not possible in the usual way because of conditions of solubility and concentration. Instead, the extract is put into a dry receptable and 0.3 gram silica gel of a particle size of 0.2 to 1.0 mm. added. The gel has been impregnated with roughly 28 mg. of barium acetate by soaking it in distilled water with 700 gr. barium acetate to the litre and afterwards drying it. Extract and silica gel are moderately shaken for about a minute. First, part of the residual moisture remaining in the extract settles on the silica gel and forms around it a water mantle which contains the aforementioned barium salt dissolved in highest concentration. Almost simultaneously, nearly all the substances present in the extract, which penetrate the barium salt-water mantle, are adsorbed by the moist silica gel. With these substances the sodium pregnanediol glucuronide also passes through the barium salt-water mantle and is immediately precipitated as barium pregnanediol glucuronide which, as a result of the mechanical effect of shaking, is immediately washed out of the water mantle in crystalline form back into the extract. This operation, comprising adsorption, almost simultaneous precipitation and quasi desorption and which theoretically accomplishes the traditional stages of adsorption, elution, drying, redissolving, precipitation, etc. in a single stage, will be described hereinafter as adsorption-precipitation.

The suspension present in the fluid phase upon shaking consists chiefly of Ba-pregnanediol glucuronide (if any), fine particles of silica gel and traces of barium sulfate and carbonate. This suspension is transferred with the fluid phase (by pouring) to a second dry receptacle leaving the silica gel behind. To accelerate settling of the suspension 0.5 cc. of gasoline, petroleum ether, benzene, etc., and 0.15 cc. N/50 hydrochloric acid are added and mixed by very vigorous shaking.

By this means the solid bodies become wet on their surface and thus "sticky," they cling to one another and sink down relatively quickly (within 10 to 20 minutes), due to increase in weight resulting from taking up moisture, to the bottom of the receptacle, where they remain stuck in consequence of their high moisture content. It is then possible to pour off the mother fluid without stirring up the deposit. The hydrochloric acid in turn displaces as free acid any uronic acid salt adsorbed to it. This acid salt might vitiate the later glucuronic acid reaction, as it is adsorbed by all the precipitated substances. That admixture of gasoline and N/50 hydrochloric acid is not absolutely necessary, but omitting it would make the settling time much longer.

Upon removal of the supernatant fluid, the residue is taken up in 1 to 2 cc. of water. To this mixture 1.5 cc. pure, concentrated hydrochloric acid (specific weight 1.19) and 0.5 cc. ethyl or propyl-alcohol containing 3 mg. naphthoresorcin are added. If the naphthoresorcin solution is to be rendered stable for several years, the alcohol must be completely deprived of air (deoxidized) and then saturated with $CO_2$ before dissolving the naphthoresorcin; the solution should then be sealed in ampoules, for example, and kept away from the light. The pregnanediol glucuronide is decomposed by the strong hydrochloric acid in glucuronic and steroidic molecules.

The reaction solution upon addition of naphthoresorcin and hydrochloric acid after commencement of boiling is then boiled for 1 minute and upon cooling shaken with 1.5 cc. benzene, toluol, xylol, etc., given a light green coloration by 8 mg. of aniline fat-green (Ciba) to the litre. During boiling the glucuronic part of the metabolite is compounded with the naphthoresorcin which compound forms a colored complex in benzene, and the like.

The coloration taken on from benzene serves as indication for the conception-free days: pale wine-red to dark red-violet represents a positive pregnanediol finding and thus the post-ovulatory conception-free time, green-colorless-yellow to light brown a negative pregnanediol finding and thus the conception-liable or possibly the conception-free pre-ovulatory state. From the first occurrence each time of the positive pregnanediol finding the individual fluctuations in ovulation can be recognized after several menstrual cycles and from this the beginning of the conception-liable time can be deduced, which should be established at least one week before the earliest first positive pregnanediol finding.

The present method differs from all known methods above all in its extraordinary specificity and its relative sensitivity, permitting the employment of less than one-third of the daily quantity of urine. These characteristics are the result of the manner of extraction, the manner of washing as well as of purification by adsorption precipitation. The extremely short handling time of only 12 to 15 minutes and approximately one hour for carrying out the test on the basis of the same arrangement make it possible to establish the onset of the conception-free period already 8 to 9 hours after the first pregnanediol is formed in the female body. There can therefore be no question practically of delay as regards the internal characteristic changes in the body.

The manner of extraction in a thin stream is conditioned upon the extremely small quantity of solvent employed, that being 9 cc. or 1/85 of the quantity of urine or about 1/10 to 1/20 of solvent quantity of that of the known methods. In the conventional methods of extraction (shaking, bubbling through with compressed air, stirring, etc.) the small quantity of solvent would completely dissolve under the mechanical action even in roughly 500 cc. of urine saturated with salt. The maintenance of a constant and as small a distance as possible between nozzle and level of the solvent is of greatest importance in avoiding the formation of an emulsion. The stream must therefore not impinge with force from a height onto the solvent rising higher and higher in a tube sealed at the bottom, as in the case e.g. in the extraction apparatus after Jayle and Crepy or Boroughs. Besides this the quantity of fluid flowing through must be considerably smaller than 100 cc. a minute as in these apparatus. The nozzle also must not dip into the solvent as e.g. in the apparatus after Kolfenbach, since, if it does, the stream of urine flows through the amyl-butyl alcohol mixture in a compact form so that no extraction will result. This would be the case with the principle of freely falling droplets as in conventional apparatus, inasmuch as droplets thus forming possess a total surface 3 times as small and sink through the solvent 5 times as rapidly. The admixture of amyl alcohol gives further an important reduction of the solubility of the pregnanediol in the butyl alcohol and makes the first step of the total sensitivity limit or inhibiting effect.

The manner of washing the extract, compared to the usual manner of washing, e.g., by shaking with N/3–N/10 sodium hydroxide, is much more effective, due on the one hand to the quantity of wash fluid being several times greater than the extract volume and on the other hand due to the ether character of the wash water, the latter counteracting the passage of too much pregnanediol glucuronide into the wash fluid. Since the ether alone is not sufficient to prevent such a passage in nearly mineral-free water, the wash fluid contains in addition 200 mg. of common salt, corresponding to the saturating effect of about N/3 sodium hydroxide. This washing is some 30 times more efficient than the usual methods. It should be noticed that this manner of extraction is only successful because the time required for the wash fluid bubbles to sink is too short to allow any considerable passage of the ether into the extract phase. In addition, the butanol mixture acts as a buffer in respect to the ether, for it counter-acts the passage of the ether. Were the ether to pass completely into the extract, the pregnanediol would be displaced from the latter. Since it is impossible to prevent the passage of a certain amount of pregnanediol into the wash fluid, that partly passage represents a part of the total sensitivity threshold value or total inhibiting effect.

The most important operation, and the one which best simplifies, improves and shortens the process is adsorption precipitation. This may be carried out generally in any solvent difficultly soluble in water, with any water-soluble precipitant insoluble in the solvent and with any impregnable hydrophil absorbent. It may be described as catalytic precipitation, whereby the absorbent plays the role of the catalyst.

Apart from considerable simplification of the method there is the advantage that precipitation becomes a decidedly time-conditioned operation: only the substance which is precipitated most rapidly and easily is precipitated, because any substance precipitating more slowly becomes absorbed by the silica gel before it precipitates. Adsorption precipitation is, therefore, more specific than the traditional methods of precipitation. Besides, the concentration of the dissolved substance to be precipitated from the solvent phase is insignificant, inasmuch as precipitation does not take place in the latter, but on the absorbent.

The impregnation of silica gel with barium acetate and not with another water-soluble barium salt has of itself nothing to do with the adsorption precipitation; any water-soluble barium salt insoluble in the extract might be used. Since the extract practically contains only acid substances, which are adsorbed by the silica gel, impregnation with in acid barium salt, e.g., barium chloride, counteracts the taking up of impurities by the silica gel, whereas the basic barium acetate increases the adsorption power of the silica gel. For this reason the fluid phase is purified by the silica gel, because it quickly takes up uronic acid impurities, and the risk that such impurities will be carried along by the suspension formed is avoided. Granulation of the silica gel must be neither too coarse nor too fine, since otherwise precipitation of the Ba-pregnanediol occurs to a considerable extent within the granulation porosities and leads to loss, or too large a part of the too-finely granulated silica gel remains in suspension and by adsorption of impurities vitiates the result.

Since it is inevitable that minor quantities of Ba-pregnanediol remain in crystalline form in the pores of the silica gel and another part adsorbed to it, and a further part remains dissolved in the extract phase, there is a certain loss of pregnanediol which represents another part of the total inhibiting effect.

By extraction of the dye formed with the glucuronic acid reaction after Tollens by means of benzene or its homologues the test becomes more specific in that a whole series of substances which give the reaction when ether and ethanol is employed and all polysaccharides, are eliminated. There is an added advantage in that the peroxides usually present in ether, and which destroy the dye formed, do not occur in benzene, etc. By the green coloration of the benzene, weak positive findings are avoided, since any weak red coloration is masked by the complementary color green. As a result the physiological minimum values of pregnanediol, which are due to transformation of desoxycorticosterone into progesterone, or to preovulatory ovarian progesterone secretion or possibly insufficient normal corpus luteum activity, will not yield a positive result.

That green coloration of the benzene is the most important part of the total sensitivity threshold value or inhibiting effect, because that part can be very simply controlled and furnishes the control possibility of the total threshold value. Naturally, the same effect as by these inhibiting steps could be obtained by reducing the initial volume of urine, e.g. body fluid of a woman, employed, so that to subject the quanities of the metabolism products involved to the natural sensitivity limit inherent to the determining method used. But such a sensitivity value would rather be an instable one.

The minimum quantities of pregnanediol glucuronide arising from adrenal cortex metabolism and preluteinization during the proliferative phase of the endometrium are known to be in the order of 1–2 mg. per day, while the real excretion during the luteal phase corresponds to 8–9 mg. per day (Klin. Wschr. 24/25 (1946/47), 910; physiol, Chemie, 281, 1944), 14; J. Med. de Lyon, 20, 1, 1952, p. 63). The threshold value as defined by the present invention as being considered greater than the hereinbefore mentioned minimum quantities must therefore be greater than at least 20 percent of the normal mean pregnanediol (or progesterone metabolite) content in urine during the luteal phase of the menstrual cycle, because these minimum quantities themselves correspond to 22–25 percent (of 8–9 mg.) at the maximum. The threshold value as cited above would then be in the order of an average 40 percent and as lowermost extreme 28 percent of the average normal real excretion.

By the way described, a minimum determination of pregnanediol glucuronide by the method cited as example, can only take place if the total pregnanediol content of the urine is in the average greater than 3.5 mg. and in all cases greater than 2.5 mg. per day, or, in other terms, is greater than 20 percent of the normal mean pregnanediol (or metabolite) content which corresponds to 8–9 mg. per day.

It is known that the transformation ratio of progesterone into pregnanediol is in the order of 8 to 22% and in the average of 14 to 16% (Klin. Wschr., 33 (1955), 11/12, 266; Arch. Gynak., 179 (1951), 247; Endocrinology, 27, (1940), 707; Zschr. physiol. Chem., 273 (1942), 1; J. Clin. Endocrinology, 10 (1950), 89; Biochem. J., 46 (1950), 285, 290). This transformation ratio is true when progesterone is administered artificially by injection. In the physiological case however it must be asumed that the transformation ratio lies in the upper limits mentioned above, also in the order of approx. 20%, and that it must be much more constant than has been demonstrated by these artificial experiences. Assuming a body weight of approx. 60 kgs. and thus a blood volume of approx. 5.2 litres there must be a progesterone content of 0.005 mg. per cc. of blood as a normal average (accordingly to 8–9 mg. pregnanediol glucuronide per day) and a minimum concentration of 0.0015 mg. progesterone per cc. of blood in extreme cases and 0.0021 mg. per cc. in the average case to assure all physiological functions of the corpus luteum.

This fact has been proven during experiments made with 128 women over a total of 758 menstrual cycles. In 8 to 10 cases there have been secondary premenstrual ovulations which were due to an inefficient corpus luteum activity with progesterone and pregnanediol production below the sensitivity limit mentioned hereinbefore. These premenstrual ovulations could have been cause of undesired pregnancies and resulted effectively in pregnancy in one case.

If the determination method is not based on pregnanediol but on progesterone directly or on a progesterone metabolite the sensitivity limit of such a method must be established in quantities physiologically equivalent at least to 0.0015 mg. progesterone per cc. of blood or at least to 2.5 mg. pregnanediol glucuronide per day in the urine. Such a sensitivity limit can be incorporated without any difficulty in all methods of estimating progesterone or a metabolite thereof known today. The simplest way in performing this estimation exists in all sorts of color reactions which will be inhibited to the above mentioned limit. Such inhibition can take place by any means which reduces the visibility of the color to the desired extent, and it can be done by using oxidants, reducing or complex forming substances which decolorize or mask the desired amount of color, by using adsorbents or precipitants which adsorb or precipitate said limit color amount or by complementary colorants which compensate for it, and so on, as it has been described in the method cited as example.

The method is so simple to carry into effect and the time required therefore is so small, that it is suitable not only for a specially equipped laboratory, but may also be used by any lay person, or any woman herself. Whereas in the laboratory any apparatus designed to meet the demands of the method, especially extraction, is suitable, for the lay person a special, small apparatus is essential, permitting the tester to work in accordance with instructions. In addition, the means or the substance combination or the chemicals necessary to carry out the test, already prepared, measured, mixed and suitably packed may be made available for the lay person.

It is another object of the present invention to provide for a method of determining when the biologically conception free period in a woman exists which will be of simple and always uniform execution, and which employs a minimum of chemicals so as to be of commercial interest.

It is still another object of the present invention to provide for a method of determining when the biologically conception-free period in a woman exists which will be sensitive, specific and have its result ascertainable colorimetrically.

It is a further object of the present invention to provide for an apparatus for use with a method of determining when the biologically conception-free period in a woman exists which will be compact and so easily manipulated that a lay person may use it successfully to carry out the method, and which has members accommodated to help the inhibiting effect of the method.

It is then an object of the present invention to provide for a means or a substance combination to carry into effect a method of determining the biologically conception-free period in a woman, which includes at least an inhibiting substance for reactions of ovarian metabolism products, and which is prepared and packaged in adequate manner to permit a lay person to use it successfully to carry out the method.

These and other objects and features of advantage of the present invention will become more apparent by reference to an illustration of one embodiment of the apparatus of the invention in the accompanying drawings, in which:

FIGURE 1 shows an extraction apparatus according to the invention in working condition, parts being shown in section;

FIGURE 2 shows a complete apparatus in storage position;

FIGURE 3 shows a shaking cup for wash fluid, with cover applied;

FIGURE 4 shows a flask holder with a reaction flask, a burner and a condenser hose in practical condition.

According to the embodiment illustrated, the extraction apparatus comprises a lower vessel 1 and an extractor tube 2 therein (tube diameter preferably 10.5 mm.) which is hermetically closed on the vessel 1 by means of gaskets or seals 9. Screwed onto the tube 2 over a seal 14 is a nozzle piece 3 (jet diameter preferably 0.58 mm.) and mounted on the latter over a seal disk 18 is an upper vessel 4. Inserted into the vessel 4 is a sieve 7 retained by a tension spring 6, the upper vessel being closed by a cover 5. The top part of the extractor tube 2 houses a pump including a plunger 15, a stop-screw 16, a compression spring 17 and a valve hose 25 and further a valve having a turning knob 12, a valve disk 11, with seal 10 and outlet 13. Arranged adjacent the extractor tube 2 is an overflow 2a with a lid 8 at the bottom. In the upper part of the nozzle-piece 3, immediately over the nozzle a valve may be mounted to regulate the pressure of the stream of urine flowing through the nozzle. This valve is not absolutely necessary and is therefore omitted in the drawing.

In the storage condition of the apparatus (FIG. 2), upper vessel 4, nozzle-piece 3 and all other components are accommodated within the lower vessel 1. The apparatus then takes up only about a third of its size when in use. The cover 5, the seal 19 thereof is intended to seal off a shaking cup 23 (FIG. 3), is then screwed into the upper part of the extractor 2, where in the state of use the nozzle-piece is affixed. The valve 12 is closed and the plunger 15 is held down by the cover 5. Two wire clips 24 are mounted on the extractor tube 2 to hold the two reaction flasks 21 of, say, Pyrex glass (of which only one is shown in the sectional view of FIG. 2) and the nozzle-piece 3 within the lower vessel 1 or the upper vessel 4.

Lowermost is the shaking cup 23 at the enlarged stabilizing portion of the extractor tube 2, and therebehind a burner 22 and next to it a flask holder 20 are fixed. A condenser hose 26 (FIG. 4) and the sieve 7 are not shown because they are flexible and therefore may be accommodated anywhere within the apparatus.

The chemicals or means for carrying out the test are contained for practical reasons in a package made of synthetic material, say, polyethylene, polystyrene, polyvinylchloride, etc., consisting of a container divided into two or more compartments separated from one another. This may contain fluid chemicals in one or more of its compartments, which can be removed from the package through the hole obtained by cutting off bosses projecting on the external smooth wall thereof. The chemicals available in smaller quantities may further be contained in bag-like ampoules welded at the top, which may be opened by cutting off one edge of the closure and are for instance entirely placed within a compartment of the package container, open toward one side. In order to avoid evaporation or damage from light, the self-contained device may still be wrapped with thick, brown cellophane or lined aluminum foil, etc. Such containers as packed weigh about 30 grams and have a volume of roughly 34 cc., they may be put together in collection packages of, say, 20 pieces of 0.6 kg. total weight, which suffices at least one year for determining the conception-free time. The contents of a single package weighs nearly 16 grams and possesses a volume of approximately 19 cc., hence considerably less than in all methods of determining pregnanediol, of which none works with less than 60 to 70 cc. of chemicals.

For a determination, the 7 to 10 hours urine excretion is utilized, the lower vessel 1 serving thereby as collecting receptacle. The quantity of urine made up (to 700 cc.) with tap water to the lower mark on the lower receptacle 1. Then common or table salt is added until the fluid rises to the upper level (770 cc.). Now the extractor tube 2 with covers 5 and 8 screwed-on is placed into the lower vessel 1 so that this becomes hermetically closed by the seal 9. After 40 seconds of continuous, vigorous shaking the urine is saturated with the added salt.

While shaking, the extractor tube 2 becomes filled through the adjoining overflow tube 2a. The cover 5 is then unscrewed so as to expose the upper opening of the extractor tube 2. The valve 12 is turned to "on" position, whereby the eccentric hole in the disk 11 which, in "off" position, is closed by the stationary seal 10, comes to lie under the opening 13. The valve 12 is intended to close tightly the lower vessel 1 when the urine is being shaken, but allows the entrapped air to vent during extraction, in which the lower vessel 1 slowly becomes filled with urine. The position of the valve 12 being essential for faultless functioning of the apparatus, it has been designed in such a way that for applying the cover, the valve should be closed, and opened for mounting the nozzle-piece 3.

From the package, the 9 cc. mixture of amyl-butyl alcohol at the ratio by volume of 1:2, contained in a package compartment or plastic ampoule, is then poured off into the upper opening of the extractor tube 2, where it starts to form a layer on the urine already contained therein; because of the overflow tube 2a the solvent remains at a constant level, that is about 4 cm. below the nozzle. The nozzle-piece 3 then is placed in the extractor tube 2, the upper vessel 4 screwed thereon, and the sieve 7 and its retaining spring 6 are placed in the latter. Thereupon the lower vessel 1 filled with salt-saturated urine is removed and poured off into the upper vessel 4, while the other parts will remain connected to the nozzle-piece 3. The sieve 7 will retain any solid bodies liable to foul the nozzle. The lower vessel 1 is again immediately replaced, since urine will soon escape through the overflow. The cover 5 is applied to the upper vessel 4 and the apparatus put aside.

The quantity of urine, roughly 770 cc., then flows for about 35 minutes in a fine jet through the nozzle and impinges on the surface of the amyl-butyl alcohol (rate of flow approximately 22 cc. per minute) in the extractor. Thereby the urine is broken into many fine droplets which slowly sink through the solvent layer, to be joined therebelow with the urine already extracted, rise then through the overflow tube 2a and returns into the lower vessel 1.

After passage of the urine, the upper vessel 4 and the nozzle-piece 3 are unscrewed, rinsed with water and remounted; for this purpose the two parts may be left assembled.

Should emulsion be formed in the extraction process, then, upon closure of the valve 12, a cotton plug about half the size of a thumb is loosely balled and pushed with the aid of a knitting needle or similar object through the extractor tube 2 down to the bottom of the stabilizer portion. Thereby the mucuous substances of the urine responsible for the formation of an emulsion will be filtered out of the solvent, and the emulsion broken up. Thereupon the valve 12 is reopened.

The shaking cup 23 is now filled with 35 cc. tap or drinking water up to the graduation mark as shown in FIG. 3, and from the appropriate package compartment or plastic ampoule is added 5 cc. of ammoniacal ether-butanol in the ratio by volume of 5:1 and 0.5 cc. of water with 200 mg. of common salt dissolved therein. Now the cover 5 is placed on the shaking cup 23 and held thereon, while one vigorously shakes the cup for several seconds, the contents being then poured off into the upper vessel 4. In the same way as the urine in the extraction, this wash fluid now passes to the extract tube 2 by means of the nozzle-piece 3. The wash fluid washes the extract phase in tube 2 so that the greater part of the impurities will be washed out. Due to the ether character of the wash fluid and the small addition of common salt, the pregnanediol-glucuronide in the great majority of all cases does only to a minimum pass over into the wash fluid. There are rare instances when urine contains hardly any other substance outside of pregnanediol, and is therefore incapable of polluting the extract during the extraction. Thus, when the extract is washed, no polluting substances are present which can saturate the wash fluid, and therefore the pregnanediol is gradually washed out of the extract during the passage of the fluid just because there is no partial saturation through the absorption of impurities from the extract respectively through the resultant displacement of pregnanediol. There are, however, exceptional cases in extremely slightly impurified urine; the impurities are then removed from the extract already in the first moment of the wash so that the greater part of the wash fluid will pass the extract without further absorption of substances, being thus capable of washing out the pregnanediol-glucuronide in spite of ether and common salt contents.

In such cases of chronically slightly impurified extract it is suggested that only ⅔ of the roughly 40 cc. of mixed wash fluid be used each time or only half in extreme cases. As far as the excreted quantity of urine as well as the nature of the same (emulsion) allow, instead of the aforementioned provision, the excretion time of 7 to 10 hours may be extended to 15 and more hours, whereby the pregnanediol and impurity contents of the extract will be increased.

Upon finishing the first wash, the shaking cup is filled with 35 cc. tap water up to the graduation mark, FIG. 3; a level tablespoonful of common or table salt is added, the whole vigorously shaken for 30 to 40 seconds with cover 5 applied and, upon precipitation of the coarsest residue of salt particles, poured off through the rinsed sieve 7 into the upper vessel 4. According to the quantity of the salt residue and of the water remaining therein on being emptied, the effective quantity of salt water varies between 35 and 40 cc. The extract as freed from residual ammonia and largely dehydrated is thereupon mostly water-clear or only feebly yellow.

Upon precipitation of the finest saltwater droplets remaining in suspension (2–3 minutes after the saltwater wash) the nozzle-piece 3 and the upper vessel 4 are unscrewed and the valve 12 closed. Due to the increase in volume by the wash fluids, the urine level in the lower vessel 1 now stands somewhat beyond the overflow opening 2a.

A suitably shaped pipette (not shown) is pressed onto the seal 14, and the plunger 15 is actuated with the forefinger of the other free hand. The finger pressing on the plunger at the same time does duty for an inlet valve, and the air pressed into the lower vessel 1 is by the valve hose 25 prevented from escaping. By the overpressure produced inside the vessel 1, the extract phase rises in the extractor tube 2 until it is completely in the pipette resting on the seal 14. The top end of the free opening of the pipette is then closed with the finger and the extract is poured off into one of the reaction flasks 21 preferably of Pyrex glass, which should have a dry inner surface. Instead of by means of the pump 15, it is understood that the extract may also be drawn from the extractor tube 2, by means of pipette and suction bulb. The delicate pump arrangement could thus be dispensed with.

The appropriate "bag-type" ampoule of the package is opened, and therefrom the 0.3 gram silica gel, of 0.2–1.0 mm. particle size and impregnated with about 28 mg. of barium acetate, is added to the extract. With flask 21 plugged, the extract and silica gel are shaken for about 1 minute, whereupon barium pregnanediol-glucuronide and the finest silica gel particles will precipitate. By gently shaking the reaction flask 21 and tipping it momentarily, the silica gel grains adhering to the flask walls can be washed back into the bottom of the flask. After being allowed to stand for a few seconds, the fluid phase including suspension substances is transferred into a second reaction flask 21 which should preferably be dry.

To this second reaction flask 21, from a further ampoule, 0.5 cc. gasoline and 0.15 cc. N/50 hydrochloric acid are added and the whole mixed by brief vigorous shaking of the closed flask. The suspension immediately draws water from the extract and settles relatively quickly. According to concentration a stationary period of 10 to 20 minutes is necessary to obtain sufficient precipitate for a positive pregnanediol finding. Thereafter the deposit adheres for the greater part to the moist walls of the flask 21, and the fluid phase may readily be poured off without loss. To obtain a complete run off, the flask 21 is inverted for a short time to allow any drops then forming to drip off.

To hold the flask 21 in a substantially vertical position the holder 20, FIG. 4, is employed, which forms a stable tripod together when clamped to the reaction flask 21 since the holder 20 possesses at its end a broad two-toed foot. After the fluid phase has been emptied, water is added up to the graduation mark of the reaction flask 21, whereby the precipitate separates from the wall. From the appropriate ampoules 1.5 cc. pure concentrated hydrochloric acid and 0.5 cc. of an alcoholic naphthoresorcin solution with 3 mg. naphthoresorcin, which is completely free from oxygen and saturated with $CO_2$, is added. If no other flame is available, the burner 22 consisting only of a small cup, FIG. 4, is filled with alcohol, methylated spirit, a meta tablet, Eau de Cologne, etc., or if there is no other fuel, with the poured-off extract phase (which, however, soots somewhat on burning) and lit.

The condenser hose 26 is mounted on the flask 21 and the reaction mixture, after the onset of boiling, is boiled over the flame for one minute. The mixture often has a tendency to delay in boiling with explosion-like evaporation, for which reason the flask should be gently shaken during boiling. The penetrating unpleasant smelling vapor escaping from the flask on boiling condenses in the condenser hose 26 so that the whole reaction takes place almost without odor. This condensation is of the utmost importance, inasmuch as its stench would make its use by lay persons in living quarters impossible.

After the reaction mixture has cooled, the condenser hose 26 is removed from the flask 21 in a horizontal position to prevent the condensate from flowing out. From the last ampoule of the package, the 1.5 cc. benzene etc. colored slightly green with 8 mg. aniline fat-green to the liter is added to the flask 21 and the whole is shaken vigorously for 15–20 seconds with the flask 21 closed.

As already mentioned, the blue to red-violet coloration extracted by the benzene provides the indication for the post-ovulatory, conception-free period. If this has not yet occurred, the test is repeated in one or two days as required.

Since, in the aforedescribed method, because of the threshold value and also because of the small quantities of urine employed, there is no reaction from the pregnanediol arising from the adrenal cortex from the pre-ovulatory progesterone secretion or from insufficient, normal corpus luteum activity, and is therefore directly dependent on an efficient corpus luteum formation in the ruptured Grafian follicle or effective progesterone activity, the results for the conception-free period following ovulation are absolutely specific. The released egg cell has lost its capacity for fertilization at least 16 hours previously.

The only possibilities for failure consist in provoked ovulation or double or multiple ovulation. The first of these two possibilities can only take place in the pre-ovulatory, conception-free time, if a largely mature follicle is ready to rupture and no corpus luteum is present. Inasmuch as no woman can be excluded from the tendency to provoked ovulation, there is actually no pre-ovulatory conception-free period, as the critical act itself induces ovulation and thus leads to fertilization during the theoretically conception-free period. The second possibility is double ovulation, and this only happens in the extremely rare case of a second ovulation occurring in the cycle immediately before menstruation, when progesterone secretion is decreasing and cannot be determined analytically in advance. This danger only exists in relatively short cycles of less than 25 days, characterized by too much follicle maturation activity and the presence of relatively many almost ripe follicles in the ovary.

The chances of fertilization in such a second ovulation are extremely slight, inasmuch as the spermatozoa are faced not only by a barrier of swollen uterine mucosa, but also by the greatly increased viscosity of the cervical mucuous plug. Double ovulation in the middle of the cycle has no effect on the method, as it can only take place in the moment of insufficient corpus luteum activity or progesterone secretion, so that as a result of the equally insufficient excretion of pregnanediol caused by this in the urine not the first ovulation but only the second one is ascertainable. A second ovulation when corpus luteum activity is fully present is almost excluded. If such were at all possible, then it would always happen, and there could be no question of periodicity of female genital function.

With the present invention an ideal type of birth control is realized. Apart from cases of ovarian insufficiency with inadequate excretion of pregnanediol and the practical possibility of failure in cases of pathological urine or hormone treatment, this novel type of birth control offers every conceivable security. It possesses neither the drawbacks of the well-known unnatural measures, nor does it cause any damage to the body as do certain chemical and mechanical preventives; for these reasons this method is of importance for sexual hygiene and public health.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. Method of determining the conception-free period in women by examining corpus luteum activity, comprising determining progesterone metabolites contained in the urine of the woman to be tested, inhibiting the sensibility of the determination up to a threshold value of at least 0.0015 mg. of physiologically equivalent progesterone per cc. of blood which corresponds to at least 2.5 mg. of equivalent pregnanediol glucuronide per day in the urine.

2. Method of determining the female conception-free period by examing corpus luteum activity, comprising determining the height of the progesterone level by the steps of extracting at least one progesterone metabolite from the urine of the female to be tested, said metabolite comprising a glucuronide and a steroidic part having the general formula $C_{21}H_xO_z$, contacting said metabolite extract with an adsorbent which is impregnated with a precipitant, reacting said precipitated metabolite with a substance which reacts with conjugated steroidic-glucuronic and glucuronic molecules by a color reaction, dissolving said colored reaction product, and masking the color developed to such an extent that the determination of any progesterone level is only possible above a threshold value of at least 0.0015 mg. of physiologically equivalent progresterone per ccm. blood which corresponds to at least 2.5 mg. of equivalent pregnanediol glucuronide per day in the urine.

3. Method of determining the female conception-free period by examining corpus luteum activity, comprising determining the height of the progesterone level by the steps of extracting at least one progesterone metabolite from the urine of the female to be tested by means of a mixture of two solvents with different solubilities for said metabolite, said metabolite comprising a glucuronic and a steroidic part having the general formula $C_{21}H_xO_z$, contacting said metabolite extract with an adsorbent which is impregnated with a precipitant, reacting said precipitated metabolite with a substance which reacts with conjugated steroidic-glucuronic and glucuronic molecules by a color reaction, dissolving said colored reaction product, and masking the color developed by a complementary colorant to such an extent that the determination of any progesterone level is only possible above a threshold value of at least 2.5 mg. of physiologically equivalent pregnanediol glucuronide per day.

4. Method of determining the female conception-free period by examining corpus luteum activity, comprising determining the height of the progesterone level by the steps of extracting at least one progesterone metabolite from the urine of the female to be tested by means of a mixture of two solvents with different solubilities for said metabolite, said metabolite comprising a glucuronic and a steroidic part having the general formula $C_{21}H_xO_z$, contacting said metabolite extract with an adsorbent which is impregnated with a precipitant, reacting said precipitated metabolite wtih a substance which reacts with conjugated steroidic-glucuronic and glucuronic molecules by a color reaction, dissolving said colored reaction product, and masking the color developed by a complementary colorant to such an extent that the determination of any progesterone level is only possible above a threshold value of at least 2.5 mg. of physiologically equivalent pregnanediol glucuronide per day, extracting pregnanediol glucuronide from the urine by means of a mixture of butyl and amyl alcohol, mixing the extract with silicagel impregnated with barium acetate, reacting the precipitated pregnanediol glucuronide with naphthoresorcine in the presence of hydrochloric acid resulting in a specific color reaction for glucuronic acid, and extracting the red-violet colorant formed in said color reaction by means of benzene in the presence of such a quantity of a complementary green colorant to compensate the color reaction up to a threshold value of at least 2.5 mg. pregnanediol glucuronide per day.

References Cited in the file of this patent

Westphal: Z. Physiol. Chem., vol. 281, pp. 14 to 24 (1944). (Copy in Lib.)
Verboon: Anal. Abstracts, vol. 5, Abstract #3485 (1958). (Copy in Library.)
Jensen: Ibid. vol. 3, Abstr. #799 (1956).
Chem. Abstr. vol. 45, 1951, p. 6746e. (Copy in Library.)
Snell: "Colorimetric Methods of Anal.," vol. 4, 1954, chapter 10. The more specific pages relied upon are pages 416–419.
Pincus: "The Hormones," vol. II, 1950, pages 368–378.
Haw: "Practical Physiological Chemistry," 13th ed., 1954, pages 762 to 764, 776 to 777.
(The above references in Sci. Lib.)